(12) United States Patent
Kamei et al.

(10) Patent No.: US 9,576,034 B2
(45) Date of Patent: Feb. 21, 2017

(54) RECIPE PRESENTATION SYSTEM AND RECIPE PRESENTATION METHOD

(71) Applicant: Panasonic Corporation, Osaka (JP)

(72) Inventors: Rinako Kamei, Osaka (JP); Norihiro Matsui, Osaka (JP); Takuya Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 267 days.

(21) Appl. No.: 14/117,676

(22) PCT Filed: Sep. 21, 2012

(86) PCT No.: PCT/JP2012/006025
§ 371 (c)(1),
(2) Date: Nov. 14, 2013

(87) PCT Pub. No.: WO2013/073092
PCT Pub. Date: May 23, 2013

(65) Prior Publication Data
US 2014/0089299 A1    Mar. 27, 2014

(30) Foreign Application Priority Data
Nov. 18, 2011 (JP) ................. 2011-253277

(51) Int. Cl.
*G06F 17/30* (2006.01)
*G06Q 50/04* (2012.01)
*G06Q 50/12* (2012.01)

(52) U.S. Cl.
CPC ......... *G06F 17/30554* (2013.01); *G06Q 50/04* (2013.01); *G06Q 50/12* (2013.01); *Y02P 90/30* (2015.11)

(58) Field of Classification Search
CPC .................. G06F 17/30864; G06F 17/30554; G01F 19/00; G01F 19/002
See application file for complete search history.

(56) References Cited

U.S. PATENT DOCUMENTS 8,335,796 B2    12/2012   Maeda et al.
8,578,293 B2 *  11/2013   Breunig .................. F24C 7/082
                                                                  715/812
(Continued)

FOREIGN PATENT DOCUMENTS

JP    2002-56077    2/2002
JP    2002-84989    3/2002
(Continued)

OTHER PUBLICATIONS

International Search Report issued Dec. 11, 2012 in International Application No. PCT/JP2012/006025.

*Primary Examiner* — Yuk Ting Choi
(74) *Attorney, Agent, or Firm* — Wenderoth, Lind & Ponack, L.L.P.

(57) ABSTRACT

A recipe presentation system which presents an integrated recipe for a plurality of dishes includes: a recipe storage unit storing recipes for dishes including preparation elements arranged in a hierarchy according to closeness to completion of preparation of the respective dishes; a recipe selection unit which allows a user to select a first recipe and a second recipe from among the recipes; an overlapping preparation element identification unit which identifies common preparation elements between the first recipe and the second recipe; a recipe integration unit which generates the integrated recipe by arranging, in order of preparation, the preparation elements included in the first recipe and the preparation elements included in the second recipe, in a manner such that the user recognizes, as a single preparation (Continued)

element, the common preparation elements; and a recipe output unit which outputs the integrated recipe.

5 Claims, 11 Drawing Sheets

(56) References Cited

U.S. PATENT DOCUMENTS

| | | | |
|---|---|---|---|
| 2003/0120506 A1 | 6/2003 | Komiya et al. | |
| 2003/0195779 A1* | 10/2003 | Scholl | G06Q 10/06 702/19 |
| 2005/0192869 A1* | 9/2005 | Maeda | G06Q 30/0601 705/26.1 |
| 2009/0132480 A1* | 5/2009 | Liron | G06F 17/30392 707/999.003 |
| 2011/0055044 A1* | 3/2011 | Wiedl | G06Q 30/02 705/26.5 |
| 2011/0055289 A1* | 3/2011 | Ennis | G06Q 10/06 707/805 |
| 2012/0136864 A1* | 5/2012 | Ochtel | G06Q 30/0633 707/738 |

FOREIGN PATENT DOCUMENTS

| | | |
|---|---|---|
| JP | 2002-189899 | 7/2002 |
| JP | 2006-11036 | 1/2006 |
| JP | 2007-156639 | 6/2007 |
| WO | 01/90979 | 11/2001 |
| WO | 03/107233 | 12/2003 |

* cited by examiner

FIG. 4A

| Step ID | a33 |
|---|---|
| Foodstuff | Croquette ingredients |
| Quantity | 640 g |
| Process | Mix |
| Preceding step ID | a32, a42 |
| Following step ID | a14 |
| Overlapping step ID | – |

FIG. 4B

| Step ID | a32 |
|---|---|
| Foodstuff | Potato |
| Quantity | 540 g |
| Process | Mash |
| Preceding step ID | a31 |
| Following step ID | a33 |
| Overlapping step ID | b12 |

FIG. 4C

| Step ID | b12 |
|---|---|
| Foodstuff | Potato |
| Quantity | 60 g |
| Process | Mash |
| Preceding step ID | b11 |
| Following step ID | b13 |
| Overlapping step ID | a32 |

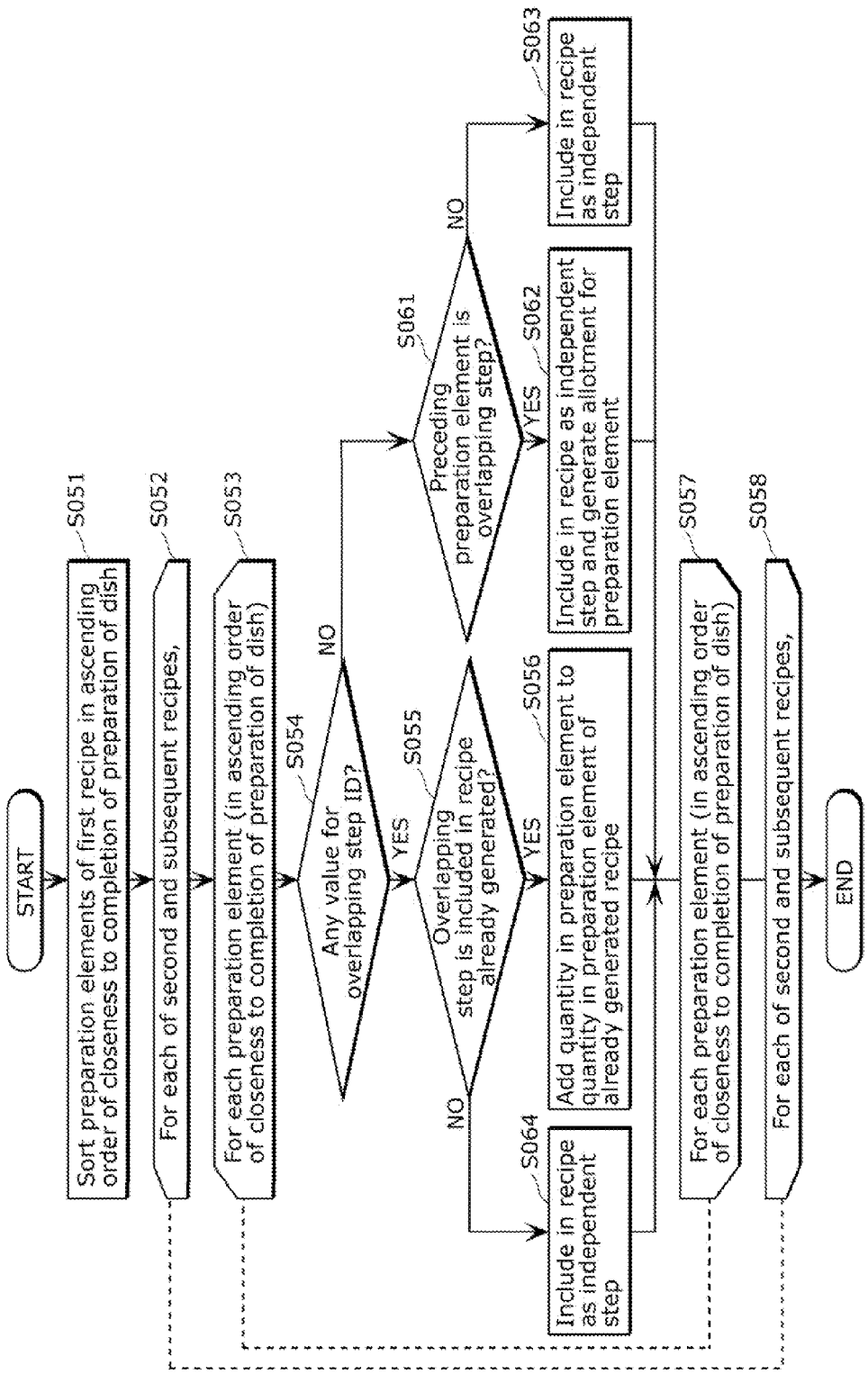

FIG. 8

Potato croquettes and mashed potato with egg

- Ingredients:
  3 large potatoes (600 g)
  100 g ground pork
  1 1/2 eggs
  Right amount of flour

- Preparation method:

Boil the potatoes (600 g).
Mash the potatoes (600 g).

Divide

540g → Stir-fry the ground pork.
Mix the mashed potato and stir-fried ground pork to make croquette filling.
Dredge patties of the croquette filling in flour, and then dip in beaten egg (1).
Fry the patties.
Ready to serve!

60g → Boil the egg (1/2).
Mix the mashed potato and the boiled egg.
Ready to serve!

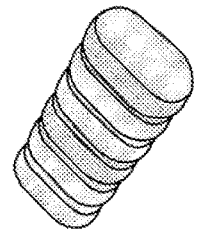

Potato croquettes recipe

● Ingredients:
3 large potatoes (600 g)
100 g ground pork
1 egg
Right amount of flour ● Preparation method:
1. Boil the potatoes.
2. Mash the potatoes.
3. Stir-fry the ground pork.
4. Mix the mashed potatoes and stir-fried ground pork to make croquette filling.
5. Dredge patties of the croquette filling in flour, and then dip in beaten egg.
6. Fry the patties.
Ready to serve!

(b)

Mashed potato with egg

● Ingredients:
1 tablespoon of flaked potato
1/2 egg

● Preparation method:
1. Boil the potato.
2. Mash the potato.
3. Boil the egg.
4. Mix the mashed potato and the boiled egg.

Ready to serve!

RECIPE PRESENTATION SYSTEM AND RECIPE PRESENTATION METHOD

TECHNICAL FIELD

The present invention relates to recipe presentation systems and recipe presentation methods. In particular, the present invention relates to a recipe presentation system and a recipe presentation method each for presenting an integrated recipe for a plurality of dishes.

BACKGROUND ART

Conventionally, information on dishes and recipes for the dishes have been available on cookbooks, cooking shows, and websites including cooking information on the Internet. The information on recipes for dishes includes a method for making a dish (preparation method), ingredients and quantity thereof, utensils to use, cooking time, and nutrition values. Users prepare the dishes shown in such media with reference to the recipes.

There has been a disclosed technique for displaying, as a single combined method, preparation methods for parallel preparation of a plurality of dishes (see Patent Literature (PTL) 1). Furthermore, there has been a disclosed technique which enables searching of recipes based on an ingredient or a step in a preparation method in the recipes (see PTL 2).

CITATION LIST

Patent Literature

[PTL 1] Japanese Unexamined Patent Application Publication No. 2002-84989
[PTL 2] International Publication No. 2003/107233
[NPL 1]

SUMMARY OF INVENTION

There has been a problem that parallel preparation of a plurality of dishes takes extra time and effort of a user.

In view of this, the present invention is conceived to provide a recipe presentation system for presenting an integrated recipe which saves a user time and effort to prepare a plurality of dishes.

A recipe presentation system according to an aspect of the present invention is a recipe presentation system which presents an integrated recipe for a plurality of dishes and includes: a recipe storage unit storing recipes for dishes including preparation elements arranged in a hierarchy according to closeness to completion of preparation of the respective dishes, the preparation elements indicating an ingredient and a process for completing preparation of each of the dishes; a recipe selection unit configured to allow a user to select a first recipe and a second recipe distinct from the first recipe from among the recipes stored in the recipe storage unit; an overlapping preparation element identification unit configured to identify common preparation elements between the first recipe and the second recipe as overlapping preparation elements; a recipe integration unit configured to generate the integrated recipe by arranging, in order of preparation, the preparation elements included in the first recipe and the preparation elements included in the second recipe, in a manner such that the user recognizes, as a single preparation element, the overlapping preparation elements identified by the overlapping preparation element identification unit; and a recipe output unit configured to output the integrated recipe generated by the recipe integration unit.

Each general or specific aspect of the present invention may be implemented using a system, a method, an integrated circuit, a computer program, or a computer-readable recording medium such as a CD-ROM/or any combination of a system, a method, an integrated circuit, a computer program, and a recording medium.

The recipe presentation system in the present invention is capable of presenting a user who prepares a plurality of dishes with a recipe from which the user can easily understand a common process between the plurality of dishes.

BRIEF DESCRIPTION OF DRAWINGS

FIG. 4A shows an example of preparation elements in the recipe presentation system according to the embodiment.
FIG. 4B shows another example of preparation elements in the recipe presentation system according to the embodiment.
FIG. 4C shows the other example of preparation elements in the recipe presentation system according to the embodiment.
FIG. 7 is a flowchart showing processing to be performed by a recipe integration unit of the recipe presentation system according to the embodiment.
FIG. 8 shows an example of integrated recipe to be presented by the recipe presentation system according to the embodiment.
FIG. 10 shows examples of conventional recipes.

DETAILED DESCRIPTION OF THE INVENTION (Underlying Knowledge Forming Basis of the Present Invention)

The inventors have found the following problem with the technique for displaying recipes described in a foregoing section, "Background Art".

Conventionally, information on dishes and recipes for the dishes have been available on cookbooks, cooking shows, and websites including cooking information on the Internet. The information on recipes for dishes includes a method for making a dish (preparation method), ingredients and quantity thereof, utensils to use, cooking time, and nutrition values. Users prepare the dishes shown in such media with reference to the recipes.

In general, when a meal is prepared at home, plural dishes such as a main dish, a side dish, and soup are prepared in parallel. In particular, when a member of a family is an infant who needs to be fed with baby food, a person allergic to a specific food, or a person having a food restriction, it is necessary for a homemaker of the family not only to plan a special dish for the member but also to get all ingredients necessary for dishes to prepare and efficiently proceed with one preparation method for one dish and another preparation method for another dish in parallel.

FIG. 10 shows examples of conventional recipes. When a user wants to cook a dish "potato croquettes" for adults and a baby food "mashed potato with egg" for an infant, the user has (a) a recipe for "potato croquettes" and (b) a recipe for "mashed potato with egg" shown in FIG. 10 ready beforehand. Subsequently, the user prepares the dishes with reference to the two recipes to determine processes to perform to prepare the dishes efficiently.

There has been a disclosed technique for displaying, as a single combined method, preparation methods for parallel preparation of a plurality of dishes (see PTL 1). Furthermore, there has been a disclosed technique which enables searching of recipes based on an ingredient or a step in a preparation method in the recipes (see PTL 2).

Figure 11:
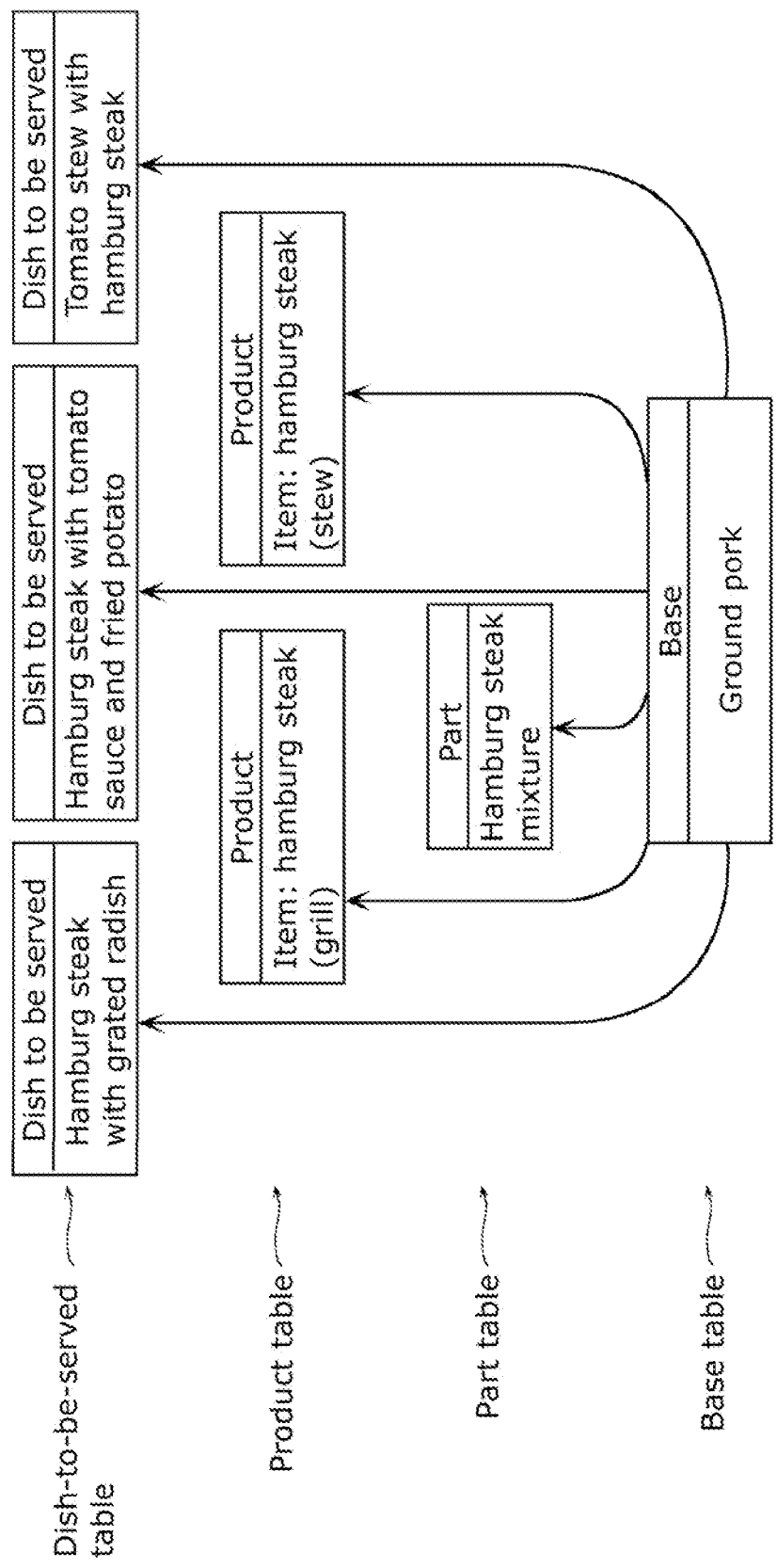
FIG. 11 shows an example of a conventional recipe DB.

FIG. 11 shows an example of a conventional recipe DB. The recipe DB in FIG. 11 is an example of a database in which recipes broken down into data elements such as an ingredient and a preparation step are stored as such. The recipe DB includes four databases of a dish-to-be-served DB, a product DB, a part DB, and a base DB which compose a recipe. The four databases are each a record, of data indicating an object of a process which is a chronological step in a preparation method of a recipe. The data is recorded in a "base table", a "part table", a "product table", and a "dish-to-be-served table" in a corresponding manner. The data in each of the tables corresponds to a preparation element. An item of the data "base" indicates at least one of an ingredient (for example, a vegetable, a meat, or a spice) or a utensil to be used for processing the ingredient. An item of the data "part" indicates at least one of processed "base" (for example, a chopped vegetable, a pre-seasoned fish or a pre-seasoned meat) or a utensil to be used for the processing. The data "product" indicates at least one of combined or processed "parts" or a utensil to be used for the combining or the processing. More specifically, the data "product" indicates an object of a process such as boiling, grilling, steaming, deep-frying, or stir-frying or an event thereof. For example, the data "product" indicates a grilled hamburg steak as a single item or a frying pan. An ingredient which can be indicated by an item of the data "product" without being subjected to a process (for example, a spice) is indicated by the data "part". Thus, ingredients such as spices may be recorded as items of the data "base" and as items of "part" as well. The data "dish-to-be-served" indicates at least one of a dish to be served, a plate or a utensil to be used for serving the dish, or a process in the serving (for example, serving on a plate, dressing with a sauce, or adding something as a garnish).

In order to prepare a plurality of dishes, a user needs to get ingredients necessary for each of the dishes and proceed with the preparation methods with reference to the recipes for the dishes. The user may be unaware of a common element between the recipes for the dishes. In this case, there is a problem that the user processes an ingredient only for one of the dishes and performs the same process again for the other dish, taking extra time and effort. This creates a challenge of presenting a user who prepares a plurality of dishes in parallel with a recipe from which the user can easily understand common elements between recipes for the dishes.

In the conventional technique according to PTL 1, a preparation method is generated according to a processing time to be taken for each of the recipes for dishes to be prepared in parallel. In this case, no determination is made as to whether or not the recipes for dishes to be prepared in parallel include any common preparation element. The common preparation elements, which can be handled as a single element, are presented as separate elements. The above problem thus remains unsolved and time and effort which would be saved are overlooked unless the user notices the common preparation elements.

PTL 2 discloses a conventional technique in which recipe information is structured so as to enable search of recipes by an ingredient or a preparation method therein. However, PTL 2 does not disclose a method of presenting a preparation method suited for parallel preparation of a plurality of dishes, and thus the above problem still remains unsolved.

In view of this, the present invention has an object of providing a recipe presentation system for presenting an integrated recipe which saves a user time and effort to prepare a plurality of dishes.

In order to achieve the above object, provided is a recipe presentation system according to an aspect of the present invention which is a recipe presentation system which presents an integrated recipe for a plurality of dishes and includes: a recipe storage unit storing recipes for dishes including preparation elements arranged in a hierarchy according to closeness to completion of preparation of the respective dishes, the preparation elements indicating an ingredient and a process for completing preparation of each of the dishes; a recipe selection unit configured to allow a user to select a first recipe and a second recipe distinct from the first recipe from among the recipes stored in the recipe storage unit; an overlapping preparation element identification unit configured to identify common preparation elements between the first recipe and the second recipe as overlapping preparation elements; a recipe integration unit configured to generate the integrated recipe by arranging, in order of preparation, the preparation elements included in the first recipe and the preparation elements included in the second recipe, in a manner such that the user recognizes, as a single preparation element, the overlapping preparation elements identified by the overlapping preparation element identification unit; and a recipe output unit configured to output the integrated recipe generated by the recipe integration unit.

This allows a user who prepares a plurality of dishes to easily find overlapping preparation elements which are common preparation elements between the recipes for the dishes. The user can perform processes indicated in the common preparation elements at a time by following the output integrated recipe. The system thus saves the user time and effort for preparation.

For example, each of the preparation elements indicates a quantity of a foodstuff to be processed according to the process indicated in the preparation element, and the recipe integration unit is configured to calculate, as a quantity of foodstuffs indicated in the overlapping preparation elements, a total of quantities of the foodstuffs indicated in the preparation elements of the first preparation method and the foodstuffs indicated in the preparation elements of the second preparation method.

This allows a user to recognize correct quantities of foodstuffs for the overlapping preparation elements and get and process the foodstuffs with less effort. The system thus saves the user time and effort for preparation.

For example, each of the preparation elements indicates a quantity of a foodstuff obtained through the process indicated in the preparation element, and the recipe integration unit includes in the integrated recipe, allotments of the foodstuff which is obtained through the process indicated in the overlapping preparation elements and is to be allotted to preparation elements next to the overlapping preparation elements in the first recipe and the second recipe.

This allows a user to divide a processed foodstuff according to presented allotments after an overlapping step, so that the foodstuff is allotted to be ready for the processes indicated in next preparation elements. The system thus saves the user time and effort for preparation.

For example, the recipe integration unit includes, in the integrated recipe, the allotments to the first recipe and the second recipe expressed as a ratio.

With this, a user no longer needs to measure a processed foodstuff in an absolute value such as "a tablespoonful" or "100 grams" to allot the processed foodstuff to next preparation elements. When a user uses a measuring utensil for measurement of a foodstuff in an absolute value, the measuring utensil needs cleaning after the use. This increases time and effort of the user to be taken for the preparation of the dishes. The recipe presentation system shows the allotments of the processed foodstuff to preparation elements next to overlapping preparation elements as a ratio which the user understands intuitively, so that the user can divide the processed foodstuff without using a measuring utensil. The system thus saves the user time and effort for preparation.

For example, the overlapping preparation element identification unit is configured to identify the overlapping preparation elements by comparing the preparation elements included in the first recipe and the preparation elements included in the second recipe, in descending order of the closeness of the preparation elements to the completion of the preparation of the respective dishes.

With this, the overlapping preparation element identification unit of the recipe presentation system needs to make fewer determinations as to whether preparation elements have common values between recipes. This is because when preparation elements have common values between recipes, preparation elements farther from completion of preparation of the respective dishes than the preparation elements having common values also have common values therebetween. It is therefore unnecessary to make the determination for the elements farther from completion preparation of the dishes than the overlapping preparation elements in the respective recipes. Thus, when the determination as to whether preparation elements have common values between recipes is started with the preparation elements closest to completion of preparation of dishes and overlapping preparation elements are identified, it is possible to narrow down preparation elements for which determination as to presence of overlapping preparation elements is to be made. This saves the recipe presentation system processing time.

For example, the overlapping preparation element identification unit is configured to identify the overlapping preparation elements by comparing the preparation elements included in the first recipe and the preparation elements included in the second recipe from preparation elements, in ascending order of the closeness of the preparation elements to the completion of the preparation of the respective dishes.

With this, the overlapping preparation element identification unit of the recipe presentation system needs to make fewer determinations as to whether preparation elements have common values between recipes. This is because preparation elements of a recipe farthest from completion of a dish indicate ingredients for the dish. When preparation elements have common values for "Foodstuff" between recipes, the determination as to presence of overlapping preparation elements is only necessary for the preparation elements closer to completion of the dishes than the overlapping preparation elements having the common values for "Foodstuff". Thus, when the determination as to whether preparation elements have common values between recipes is started with the preparation elements farthest from completion of preparation of dishes and overlapping preparation elements are identified, it is possible to narrow down preparation elements for which determination as to presence of overlapping preparation elements is to be made. This saves the recipe presentation system processing time.

Furthermore, a recipe presentation method for causing a computer to present an integrated recipe for a plurality of dishes includes: allowing a user to select a first recipe and a second recipe which is distinct from the first recipe from among recipes for dishes, the recipes including preparation elements arranged in a hierarchy according to closeness to completion of preparation of the respective recipes, the preparation elements indicating an ingredient and a process for completing preparation of each of the dishes; identifying common preparation elements between the first recipe and the second recipe as overlapping preparation elements; generating the integrated recipe by arranging, in order of preparation, the preparation elements included in the first recipe and the preparation elements included in the second recipe, in a manner such that the user recognizes, as a single preparation element, the overlapping preparation elements identified by the overlapping preparation element identification unit; and outputting the integrated recipe generated by the recipe integration unit.

This method produces the same advantageous effect as produced by the recipe presentation system.

Furthermore, an integrated circuit which presents an integrated recipe for a plurality of dishes includes: a recipe selection unit configured to allow a user to select a first recipe and a second recipe which is distinct from the first recipe from among recipes for dishes, the recipes including preparation elements arranged in a hierarchy according to closeness to completion of preparation of the respective dishes, the preparation elements indicating an ingredient and a process for completing preparation of each of the dishes; an overlapping preparation element identification unit configured to identify common preparation elements between the first recipe and the second recipe as overlapping preparation elements; a recipe integration unit configured to generate the integrated recipe by arranging, in order of preparation, the preparation elements included in the first recipe and the preparation elements included in the second recipe, in a manner such that the user recognizes, as a single preparation element, the overlapping preparation elements identified by the overlapping preparation element identification unit; and a recipe output unit configured to output the integrated recipe generated by the recipe integration unit.

The integrated circuit in this configuration produces the same advantageous effect as produced by the recipe presentation system.

Each general or specific aspect of the present invention may be implemented using a system, a method, an integrated circuit, a computer program, or a computer-readable recording medium such as a CD-ROM, or any combination of a system, a method, an integrated circuit, a computer program, and a recording medium.

An embodiment of the present invention shall be described below with reference to the drawings.

Note that the embodiment described below may show a general or specific example. The values, materials, constituent elements, layout and connection of the constituent elements, steps, and the order of the steps in the embodiment are given not for limiting the present invention but merely for illustrative purposes only. Therefore, among the constituent elements in the following exemplary embodiments, constituent elements not recited in any one of the independent claims are described as arbitrary constituent elements.

The same constituent elements are denoted with the same reference signs, and the description thereof may be omitted.

Embodiment

Figure 1:
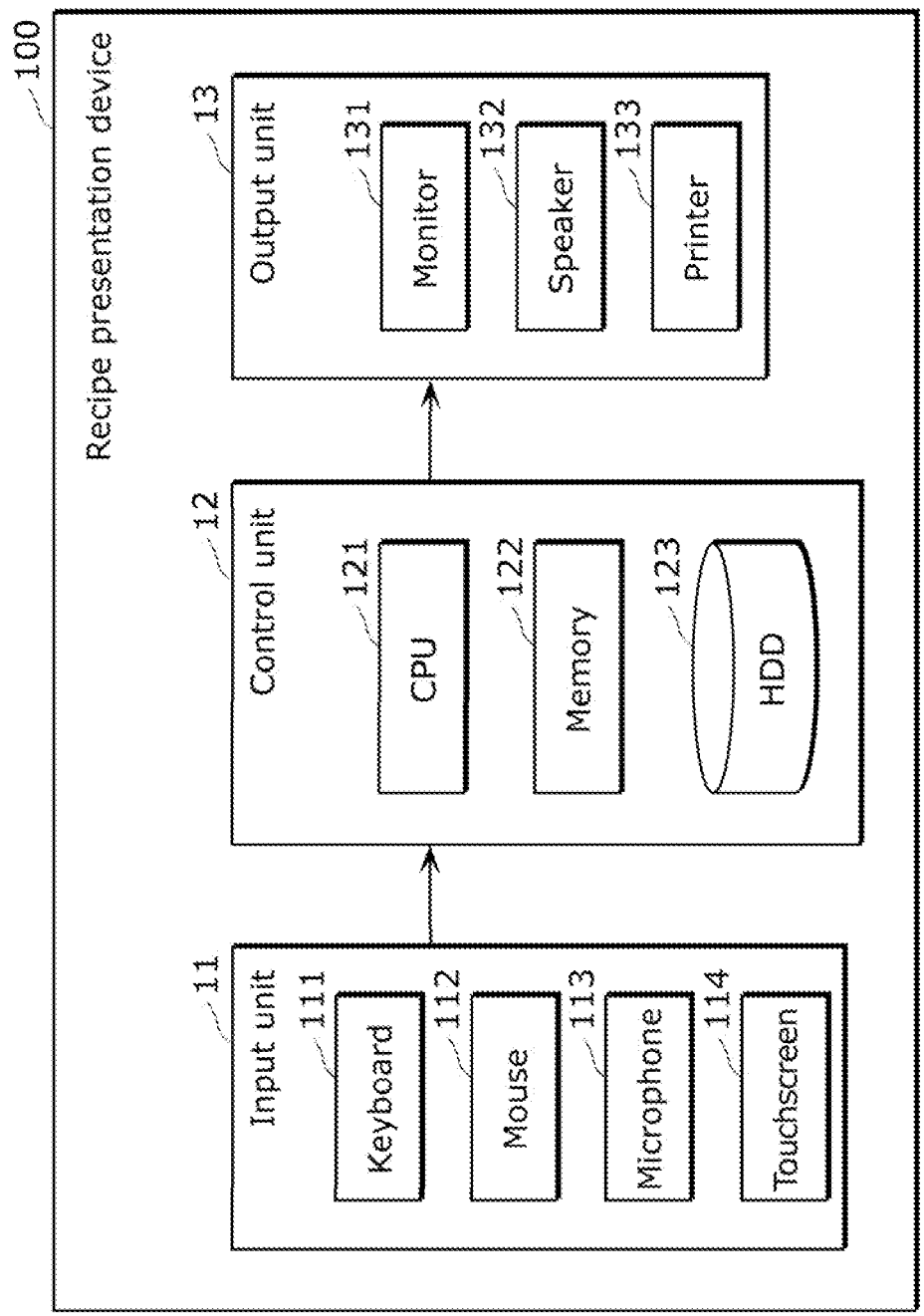
FIG. 1 shows an exemplary hardware configuration of a recipe presentation system according to an embodiment.

FIG. 1 shows an exemplary hardware configuration of a recipe presentation system 100 according to an embodiment.

As shown in FIG. 1, the recipe presentation system 100 according to the present embodiment includes an input unit 11, a control unit 12, and an output unit 13.

The block of the input unit 11 represents hardware which receives input from a user. Examples of the input unit 11 include a keyboard 111 which receives input using characters and symbols, a mouse 112 which receives input using a pointer, a microphone 113 which receives speech input, and a touchscreen 114 which receives touch input on the touchscreen.

The block of the control unit 12 represents hardware which executes a control program of the recipe presentation system 100 according to the present embodiment upon receiving input from the input unit 11. For example, the control unit 12 includes a central processing unit (CPU) which is a processor to execute the control program, memory 122 which is a work area for execution of the control program, and a hard disk drive (HDD 123 storing the control program.

The block of the output unit 13 represents hardware which outputs results of the control program from the control unit 12 in a manner intelligible to the user. Examples of the output unit 13 include a monitor which outputs such results in the form of screen images including characters, symbols, and pictures, a speaker 132 which outputs such results in the form of sound, and a printer 133 which outputs such results in the form of printed matters including characters symbols, and pictures.

Figure 2:
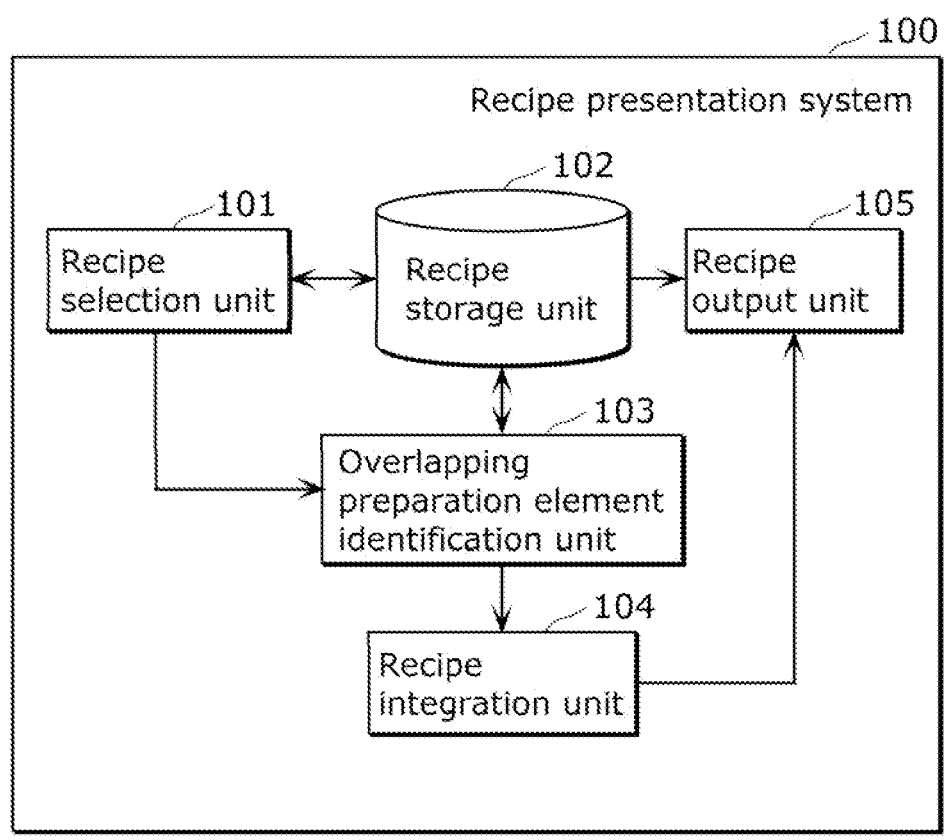
FIG. 2 shows an exemplary functional block configuration of the recipe presentation system according to the embodiment.

FIG. 2 shows an exemplary functional block configuration of the recipe presentation system 100 according to the present embodiment.

As shown in FIG. 2, the recipe presentation system 100 in the embodiment of the present invention includes a recipe selection unit 101, a recipe storage unit 102, an overlapping preparation element identification unit 103, a recipe integration unit 104, and a recipe output unit 105.

The recipe selection unit 101 represents a function to be implemented by the input unit 11 shown in FIG. 1. The recipe selection unit 101 receives input for selecting a dish from a user and provides information on the input for selecting a dish from a user to the overlapping preparation element identification unit 103. Examples of such input for selecting a dish include input of a dish name by entering characters and input of a dish name by selecting one that matches a search condition entered by a user to search for recipe information.

The recipe storage unit 102 represents a function to be implemented by the control unit 12 shown in FIG. 1. In the recipe storage unit 102, data of recipes is stored in a hierarchy of preparation elements each indicating a step necessary for processing an ingredient to complete a dish to be served. In the hierarchy, preparation elements of a dish are arranged in a graded order according to the closeness to completion of the preparation. Furthermore, the recipe storage unit 102 provides data of a recipe for a dish selected by a user to the overlapping preparation element identification unit 103. An example of data of recipes is shown as a recipe DB shown in FIG. 11.

The overlapping preparation element identification unit 103 represents a function to be implemented by the control unit 12 shown in FIG. 1. The overlapping preparation element identification unit 103 identifies, as overlapping preparation elements, common preparation elements between two or more of the recipes for the dishes selected by the user from among the recipes stored in the recipe storage unit 102.

The recipe integration unit 104 represents a function to be implemented by the control unit 12 shown in FIG. 1. The recipe integration unit 104 generates an integrated recipe by arranging, in order of preparation, preparation elements in a manner such that the user recognizes, as a single step, the overlapping preparation elements identified by the overlapping preparation element identification unit 103.

The recipe output unit 105 represents a function to be implemented by the output unit 13 shown in FIG. 1. The recipe output unit 105 outputs an integrated recipe generated by the recipe integration unit 104.

Figure 3:
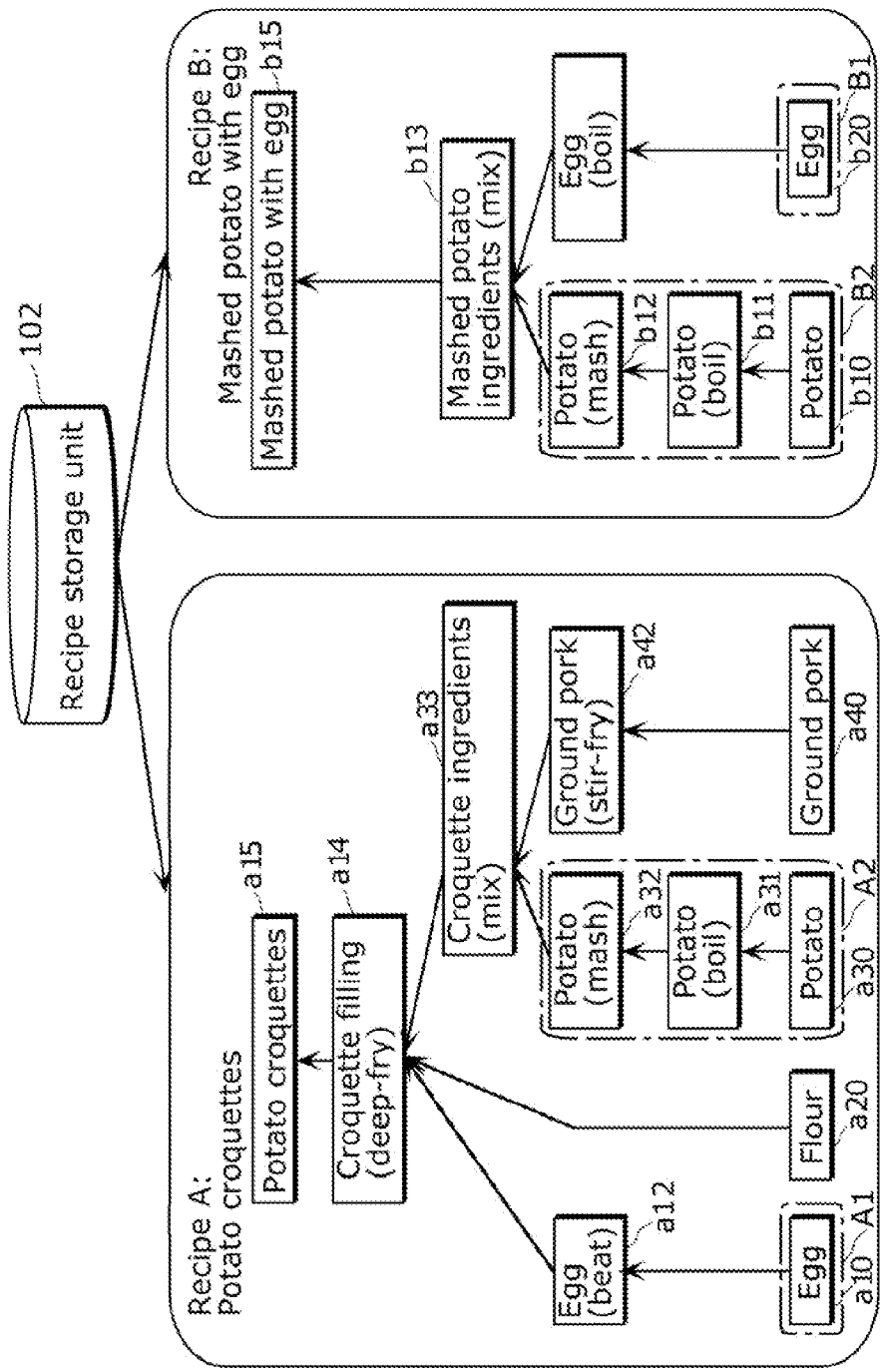
FIG. 3 shows examples of recipe data in the recipe presentation system according to the embodiment.

FIG. 3 shows examples of recipe data in the recipe presentation system 100 according to the present embodiment. FIG. 3 shows a recipe A for "potato croquettes" and a recipe B for "mashed potato with egg" stored in the recipe storage unit 102. In FIG. 3, preparation elements closer to completion of the preparation are positioned higher in the diagrams. Each of the recipe A and the recipe B includes a preparation element of "Egg", and a series of preparation elements of "Potato", "Potato (boil)", and "Potato (mash)". The preparation element of "Egg" in the recipe A is denoted by A1 and the one in the recipe B by B1. The series of preparation elements of "Potato", "Potato (boil)" and "Potato (mash)" in the recipe A is denoted by A2, and the one in the recipe B by B2.

FIG. 4A, FIG. 4B, and FIG. 4C are examples of data items of preparation elements according to the present embodiment. In each of FIG. 4A, FIG. 4B, and FIG. 4C, an item of "Step ID" represents an ID for unique identification of the preparation element. The item "Foodstuff" in each preparation element represents a foodstuff to be processed according to a process indicated in the preparation element. The item "Quantity" in each preparation element represents the quantity of a foodstuff to be processed according to a process indicated in the preparation element. The item "Process" In each preparation element is what to be performed as a process on the foodstuff indicated in the preparation element. The item "Preceding step ID" in each preparation element is a step ID of a preparation element indicating a process through which an ingredient for the foodstuff of the current preparation element is generated (that is, a preparation element through which an ingredient for the foodstuff is prepared). The item "Following step 1D" in each preparation element is a step ID of a preparation element indicating a process to be performed next on what is generated through the current preparation element. The item "Overlapping step ID" in each preparation element is a step ID of a preparation element which is included in another recipe and has the same values for the "Foodstuff" and "Process" as those of the current preparation element.

FIG. 4A shows a data structure of a preparation element a33 shown in FIG. 3. The preparation element a33 shown in FIG. 4A indicates "to mix 640 g of croquette filling". Potatoes and ground pork as ingredients of the croquette filling, which is the foodstuff of the current preparation element, are generated in a process indicated a preparation element a32 and a process indicated a preparation element a42, respectively. The preparation element indicating a process to be performed on the croquette filling generated through a process indicated in the current preparation element is a preparation element a14.

Figure 5:
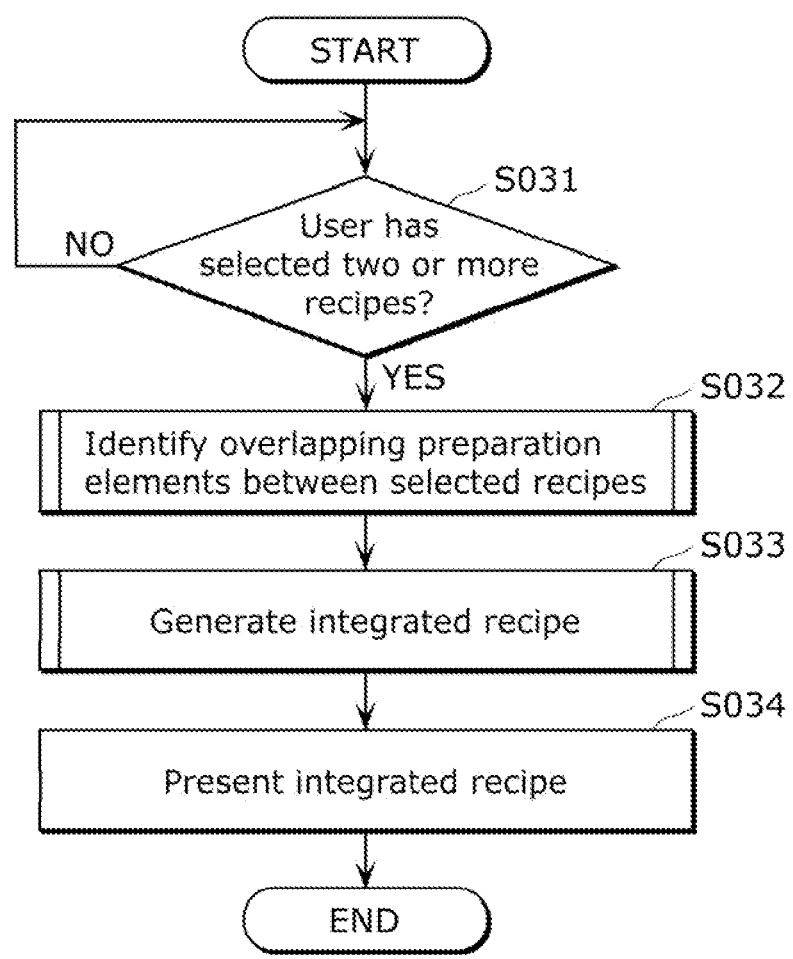
FIG. 5 is a flowchart showing processing to be performed by the recipe presentation system according to the embodiment.

FIG. 5 is a flowchart showing an outline of processing to be performed by the recipe presentation system 100 according to the present embodiment. The recipe presentation system 100 performs the processing shown in FIG. 5 to extract and process common steps between two or more recipes selected by a user and generate an integrated recipe of the selected recipes. The following describes a case as a specific example in which two recipes, that is, a recipe A for "potato croquettes" and a recipe B for "mashed potato with egg" are selected.

As shown in FIG. 5, first, the recipe presentation system 100 according to the present embodiment receives input from a user through the recipe selection unit 101, and then determines whether or not the user has selected two or more recipes (Step S031). When it is determined that the user has not selected two or more recipes, the recipe presentation system 100 further receives input from the user (Step S031, NO).

When a user has selected two or more recipes (Step S031, YES), the recipe presentation system 100 performs processing to identify overlapping preparation elements included in two or more of the recipes selected by the user, (Step S032), generates an integrated recipe from the two or more recipes selected by the user (Step S033), and then outputs the generated integrated recipe (Step S034). The following details Steps S032, S033, and S034.

Figure 6:
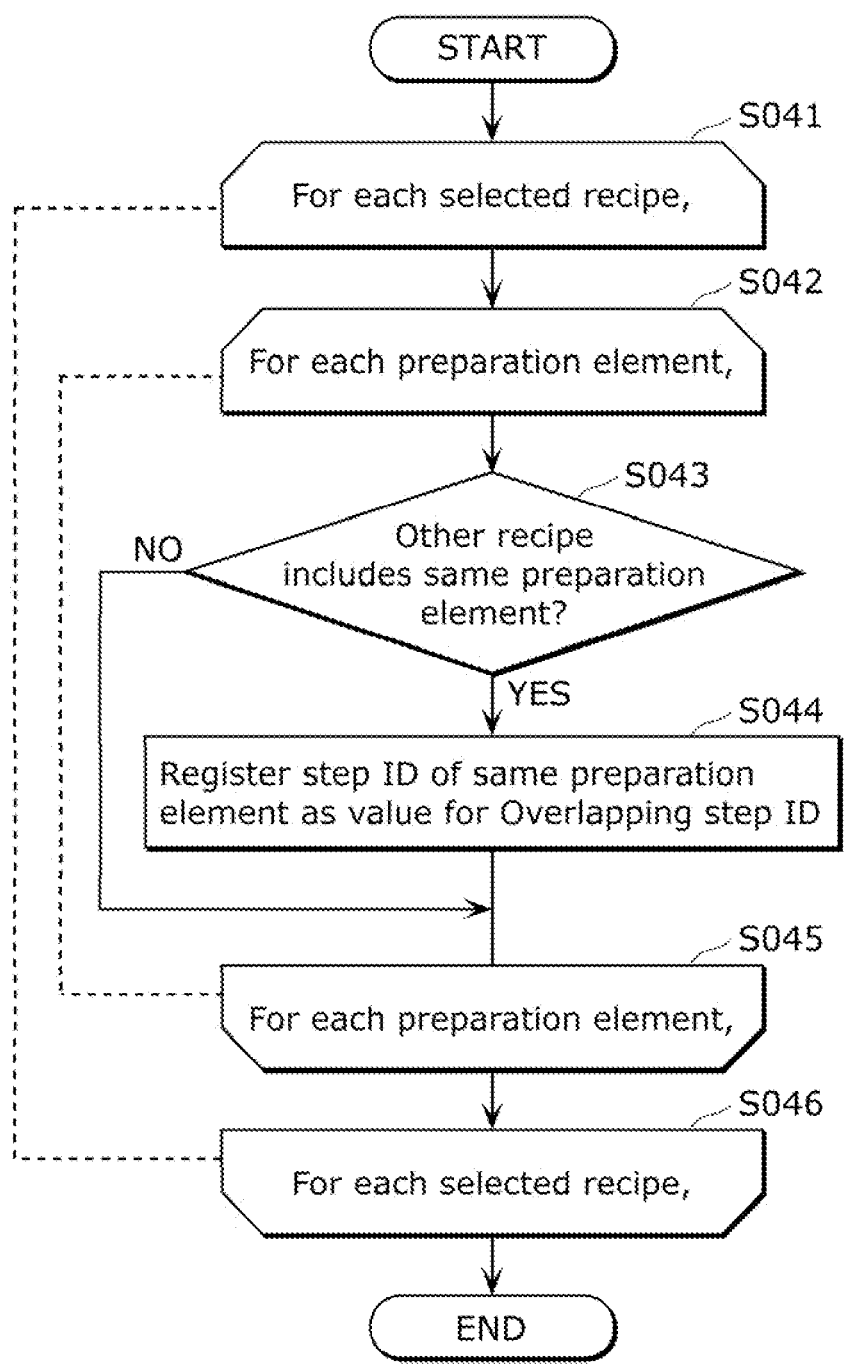
FIG. 6 is a flowchart showing processing to be performed by an overlapping preparation element identification unit of the recipe presentation system according to the embodiment.

FIG. 6 is a flowchart showing processing to be performed by the overlapping preparation element identification unit 103 of the recipe presentation system 100 according to the present embodiment. The following is a detailed description of the processing in Step S032 in FIG. 5.

First, focusing on the recipe A, which is one of the recipes selected by a user, the overlapping preparation element identification unit 103 performs the following processing (steps between Steps S041 and S046) shown in FIG. 6.

The overlapping preparation element identification unit 103 determines, for each preparation element (preparation element X) of the recipe A (steps between Steps S042 and S045), whether or not the recipe B, which is the other one of the recipes selected by the user, includes any preparation element having the same values for the items "Foodstuff" and "Process" as the preparation element X (Step S043). When the recipe B includes a preparation element having the same values for "Foodstuff" and "Process" as the preparation element X (the preparation element is referred to a preparation element Y) (Step S043, YES), the step ID of the preparation element Y is registered as a value for the item "Overlapping step ID" of the preparation element X (Step S044). When the recipe B includes no preparation element having the same values for "Foodstuff" and "Process" as the preparation element X (Step S043, NO), Step S044 is not performed.

Next, the overlapping preparation element identification unit 103 performs the same processing (steps between Steps S041 and S046) on the recipe B, which is the other one of the recipes selected by the user.

The following is a specific example of registration of a value for the item "Overlapping ID" described using FIG. 4B and FIG. 4C. FIG. 4B and FIG. 4C show data structures of preparation elements a32 and b12 in FIG. 3, respectively. The items from "Step ID" to "Following step ID" are analogously described as those in FIG. 4A. The preparation elements a32 and b12 have the same values for the items "Foodstuff" (Potato) and "Process" (Mash), and thus the preparation element ID b12 is registered as a value for the item "Overlapping step ID" of the preparation element a32, and the preparation element ID a32 is registered as a value for the item "Overlapping step ID" of the preparation element b12.

The determination as to whether the values for the items "Foodstuff" and "Process" of preparation elements are common between recipes may be performed on preparation elements in descending order of the closeness of the preparation elements to the completion of the preparation of the respective dishes. With this, the overlapping preparation element identification unit 103 of the recipe presentation system 100 needs to make fewer determinations as to whether preparation elements have common values between recipes. This is because when preparation elements have the common values between recipes, preparation elements farther from completion of preparation of the dishes than the preparation elements having the common values also have common values therebetween. It is therefore unnecessary to make the determination for the elements farther from completion of preparation of the dishes than the overlapping preparation elements in the respective recipes. Thus, when the determination as to whether preparation elements have common values between recipes is started with the preparation elements closest to completion of preparation of dishes and overlapping preparation elements are identified, it is possible to narrow down preparation elements for which determination as to presence of overlapping preparation elements is to be made. This saves the recipe presentation system 100 processing time.

Alternatively, the determination as to whether the values for the items "Foodstuff" and "Process" of preparation elements are common between recipes may be performed on preparation elements in ascending order of the closeness of the preparation elements to the completion of the preparation of the respective dishes. With this, the overlapping preparation element identification unit 103 of the recipe presentation system 100 needs to make fewer determinations as to whether preparation elements have common values between recipes. This is because preparation elements of a recipe farthest from completion of preparation of a dish indicate ingredients for the dish. When the preparation elements have common values for "Foodstuff" between recipes, the determination as to presence of overlapping preparation elements is only necessary for the preparation elements closer to completion of the dishes than the overlapping preparation elements having the common values for "Foodstuff". Thus, when the determination as to whether preparation elements have common values between recipes is started with the preparation elements farthest from completion of preparation of dishes and overlapping preparation elements are identified, it is possible to narrow down preparation elements for which determination as to presence of overlapping preparation elements is to be made. This saves the recipe presentation system 100 processing time.

FIG. 7 is a flowchart showing processing for recipe integration to be performed by the recipe integration unit 104 of the recipe presentation system 100 according to the present embodiment. The following is a detailed description of the processing in Step S033 in FIG. 5.

As shown in FIG. 7, first, the recipe integration unit 104 sorts preparation elements of a first recipe among recipes selected by a user in ascending order of closeness to completion of preparation of a dish (Step S051). The first recipe is any one of the recipes selected by a user. Assume here that a recipe A is selected.

Next, the following steps (steps between Step S052 and S058) are performed on second and subsequent recipes selected by the user. Here, the second recipe and each of the subsequent recipes is a recipe B in turn.

The following steps (steps between Step S053 and S057) are performed on each preparation elements of the recipe B.

Focusing on a preparation element X, which is one of preparation elements of the recipe B, the recipe integration unit 104 determines whether or not the preparation element X has any value for the item "Overlapping step ID" (Step S054). When the preparation element X has any value for the item "Overlapping step ID" (Step S054, YES), the recipe integration unit 104 determines whether or not a preparation element Y identified by the overlapping step ID has already been generated (Step S055). When the preparation element X has already been generated (Step S055, YES), the value for the item "Quantity" of the preparation element X is added to the value for the item "Quantity" of the preparation element Y.

When the preparation element X has not been generated yet (Step S055, NO), an integrated recipe is generated using the preparation element X as an independent preparation element (Step S064).

When the preparation element X has no value for the item "Overlapping step ID" (Step S054, NO), the recipe integration unit 104 determines whether or not a preparation element W has any value for the item "Overlapping step ID" (Step S061). The preparation element W is a preparation element immediately before the preparation element X. When the preparation element W has any value for the item "Overlapping step ID" (Step S054, YES), an integrated recipe is generated including the quantities of a foodstuff to be divided out from the preparation element W to the preparation element X, which directly follows the preparation element X, and to other preparation elements of the recipe (Step S062). Here, characters, symbols, or signs may be displayed to explicitly indicate that the foodstuff generated through the overlapping step is to be divided. For example, a message of "Divide" may be displayed.

When the preparation element W has no value for the item "Overlapping step ID" (Step S054, NO), an integrated recipe is generated using the preparation element X as an independent preparation element (Step S063).

FIG. 8 shows an example of an integrated recipe to be presented by the recipe presentation system 100 according to the present embodiment. In FIG. 8, the quantity of an ingredient "Egg" in the integrated recipe is the sum of the necessary quantity of "Egg" according to the recipe A and the necessary quantity of "Egg" according to the recipe B, that is, "1½". Similarly, the quantity of a foodstuff "potato" shown in the integrated recipe is "3 large potatoes (600 g)".

Furthermore, the overlapping steps between the recipe A and the recipe B, that is, "Potato (boil)" and "Potato (mash)" are shown as a single step, and the quantity in the step is the total of a quantity of 540 g according to the recipe A and a quantity of 60 g according to the recipe B, that is, 600 g. Furthermore, a message of "Divide" and the allotments of the divided foodstuff are displayed at a branch from the overlapping step to steps of the respective recipes to explicitly indicate that the foodstuff is to be divided.

The recipe presentation system 100 displays such an integrated recipe so that the user can process a common foodstuff between two or more recipes for dishes to be prepared in parallel. Furthermore, the user can recognize common preparation steps included in two or more recipes for dishes to be prepared in parallel and perform the steps at one time (that is, without repeating the same process twice or more).

This allows the user to recognize correct quantities of the foodstuffs for the overlapping preparation elements and easily get and process the foodstuffs. The system thus saves the user time and effort for preparation.

Furthermore, this allows the user to divide a processed foodstuff according to presented allotments after an overlapping step, so that the foodstuff is allotted to be ready for processes indicated in next preparation elements. The recipe presentation system 100 thus saves the user time and effort for preparation.

Figure 9:
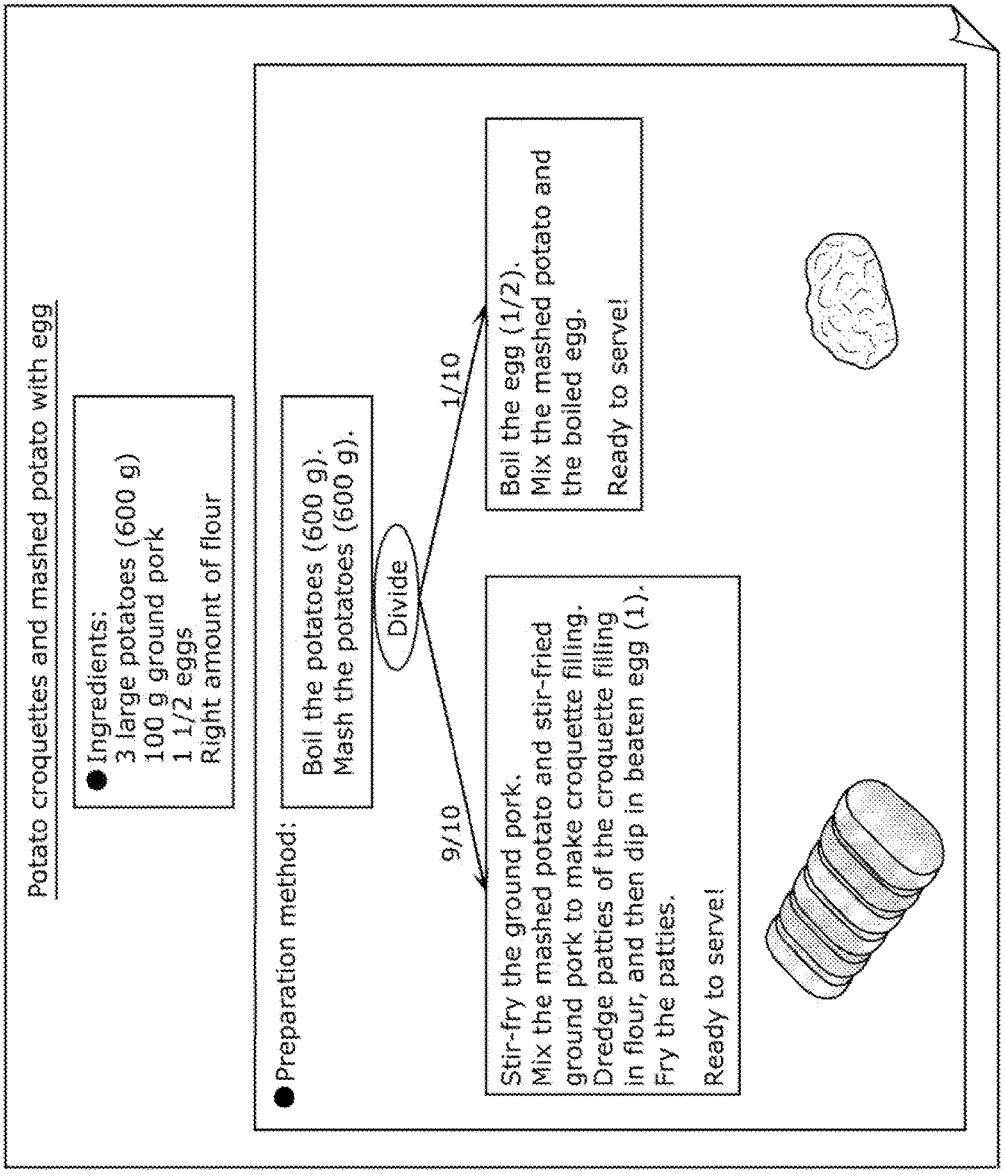
FIG. 9 shows another example of an integrated recipe to be presented by the recipe presentation system according to the embodiment.

Optionally, the allotments may be expressed as a ratio. FIG. 9 shows an example of allotments expressed as a ratio.

FIG. 9 shows another example of an integrated recipe to be presented by the recipe presentation system 100 according to the present embodiment. In FIG. 9, mashed potato weighs 600 g, and nine-tenths of the mash potato or 540 g is allotted to the recipe A, and one-tenth of the mashed potato or 60 g is allotted to the recipe B.

This shows the user the allotments in a manner such that the user understands intuitively, so that the user no longer needs to measure a processed foodstuff in an absolute value such as "a tablespoonful" or "100 grams" to allot the processed foodstuff to next preparation elements. When the user uses a measuring utensil for measurement of a foodstuff in an absolute value, the measuring utensil needs cleaning after the use. This increases time and effort of the user to be taken for preparation of dishes. The recipe presentation system 100 shows the allotments of the processed foodstuff preparation elements next to overlapping preparation elements in as a ratio which the user understands intuitively, so that the user can divide the processed foodstuff without using a measuring utensil. The recipe presentation system 100 thus saves the user time and effort for preparation of dishes.

Optionally, only one of the allotments may be explicitly displayed. Then, the user will allot the rest to the other recipe.

Next, the recipe output unit 105 outputs an integrated recipe thus generated in a manner such that the user can understand. The following is a detailed description of the processing in Step S034 in FIG. 5.

The recipe output unit 105 outputs an integrated recipe generated by the recipe integration unit 104 in a manner such that the user can understand. Specific examples of methods of outputting the integrated recipe include a method in which the integrated recipe is displayed as an image on the monitor 131, a method in which the integrated recipe is converted into a sound signal and output as a speech from the speaker 132, and a method in which the integrated recipe is output as a printed matter from the printer 133. The method of outputting integrated recipes is not limited to these examples. Other methods may be used as long as the integrated recipe is presented to a user in a manner such that the user can understand.

This allows a user who prepares a plurality of dishes to easily find overlapping preparation elements which are common preparation elements between the recipes for the dishes. The user can perform processes indicated in the common preparation elements at a time by following the output integrated recipe. The recipe presentation system 100 thus saves the user time and effort for preparation.

The recipe presentation system may be implemented not only as a single apparatus but also as a plurality of apparatuses. More specifically the recipe presentation system may be composed of a recipe presentation system terminal including the input unit 11 and the output unit 13 provided at the hand of a user, a recipe presentation system server including the control unit 12, and a network connecting therebetween. In this case, the recipe presentation system terminal and the recipe presentation system server each further includes a network interface.

With this, a control unit of a single recipe presentation system provides integrated recipes to multiple users. The recipes stored in the recipe storage unit can be easily updated and functions of the recipe presentation system can be inexpensively provided as a service to the users.

Examples of the recipe presentation system composed of a plurality of apparatus further includes a recipe presentation system terminal including the input unit 11, the output unit 13, and part of functions of the control unit 12 provided at the hand of the user, and a recipe presentation system server having the other functions of the control unit 12 accessible from the user via a network connecting the recipe presentation system terminal and the recipe presentation system server. The part of functions of the control unit 12 included in the recipe presentation system terminal at the hand of the user may be, for example, functions of at least one of the overlapping preparation element identification unit 103 and the recipe integration unit 104. The other functions of the control unit 12 included in the recipe presentation system server may be functions of the recipe storage unit 102.

This reduces the processing to be performed by the recipe presentation system server, so that processing load on the recipe presentation system server can be kept relatively low even when a large number of user are accessing the recipe presentation system server.

(Modifications)

Although the present invention is described based on the above embodiment, it should be understood that the present invention is not limited to the embodiment. The following is also within the scope of the present invention.

(1) Specifically, each of the above-described apparatuses may be implemented as a computer system including a microprocessor, ROM, RAM, a hard disk unit, a display unit, a keyboard, a mouse, and so on. The RAM or the hard disk unit stores a computer program. The microprocessor of each of the apparatuses operates according to the computer program so that the apparatus achieves its functions. Here, the computer program includes a combination of instruction codes to indicate instructions to the computer so that the computer performs predetermined functions.

(2) All or part of the components included in the respective apparatuses may be a single system large-scale integration (LSI). The system LSI is a super-multifunctional LSI manufactured by integrating constituent units on a single chip, and is specifically a computer system including a microprocessor, ROM, and RAM. The ROM stores a computer program. The microprocessor loads the computer program from the ROM to the RAM, and the system LSI achieves its functions by performing operations according to the loaded computer program.

(3) All or part of the components included in the respective apparatuses above may be an integrated circuit (IC) card or a unit of a module that are attachable to the respective apparatuses. Each of the IC card and the module is a computer system including components such as a microprocessor, ROM, and RAM. The IC card or the module may include the above-described super-multifunctional LSI. The microprocessor operates according to the computer program, so that the IC card or the module achieves its functions. The IC card or the module may also be implemented to be tamper-resistant.

(4) The present invention may be implemented as a method for the above-described processes. Furthermore, the present invention may be implemented as a computer program for performing the method, using a computer, and may also be a digital signal indicating the computer program.

The present invention may also be implemented as a computer-readable recording medium, such as a flexible disk, a hard disc, a CD-ROM, an MO, a DVD, a DVD-ROM, a DVD-RAM, Blu-ray Disc (BD), a semiconductor memory, or the like on which a computer program or a digital signal is recorded. Optionally, the present invention may be implemented as a digital signal recorded on any of the recording medium.

Furthermore, the present invention may also be implemented as a computer program or a digital signal transmitted via an electric telecommunication line, wire or wireless communication line, a network typified by the Internet, or data broadcasting.

Furthermore, the present invention may also be implemented as a computer system including a microprocessor and a memory, where the memory stores the computer program, and the microprocessor operates according to the computer program.

Optionally, the program or the digital signal may be recorded on a recording medium for transportation or transmitted through a network or the like so that the program is executed on another independent computer system.

(5) The embodiment and the modifications described above may be selectively combined for implementation.

Note that each of the functional blocks shown in FIG. 2 may be implemented as an LSI, which is an integrated circuit. These functional blocks may be integrated into a separate single chip, or some or all of the functional blocks may be integrated into a single chip. (For example, all the functional blocks other than the memory may be integrated into a single chip.)

The integrated circuit referred to as an LSI may also be referred to as an IC, a system LSI, a super LSI, or an ultra LSI according to the degree of integration.

The method of forming integrated circuitry is not limited to use of such LSIs. Dedicated circuitry or a general-purpose processor may be used instead. Also applicable is a field programmable gate array (FPGA), which allows post-manufacture programming, or a reconfigurable processor LSI, which allows past-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. The adaptation of biotechnology or the like is possible.

Among the functional blocks, only a unit for storing data to be coded or decoded may be excluded from integration into a single chip and configured otherwise.

Each of the structural elements in each of the above-described embodiments may be configured in the form of an exclusive hardware product, or may be realized by executing a software program suitable for the structural element. The constituent elements may be implemented by a program execution unit such as a CPU or a processor which reads and executes a software program recorded on a recording medium such as a hard disk or a semiconductor memory. A software program by which the recipe presentation system according to the above embodiment is implemented is as follows.

Specifically, the program causes a computer to execute a recipe presentation method for causing the computer to present an integrated recipe for a plurality of dishes, allowing a user to select a first recipe and a second recipe which is distinct from the first recipe from among recipes for dishes, the recipes including preparation elements arranged in a hierarchy according to closeness to completion of preparation of the respective recipes, the preparation elements indicating an ingredient and a process for completing preparation of each of the dishes; identifying common preparation elements between the first recipe and the second recipe as overlapping preparation elements; generating the integrated recipe by arranging, in order of preparation, the preparation elements included in the first recipe and the preparation elements included in the second recipe, in a manner such that the user recognizes, as a single preparation element, the overlapping preparation elements identified by the overlapping preparation element identification unit; and outputting the integrated recipe generated by the recipe integration unit.

A recipe presentation system according to one or more aspects of the present invention has been thus described on the basis of the embodiment. Here, it should be noted that the present invention is not limited to the embodiment. Modifications of the embodiments which would occur to those skilled in the art and embodiments in which the constituent elements in the present embodiment or the modifications thereof, are also within the scope of the one or more aspects of the present invention.

The recipe presentation system according to the present invention is advantageously used as a recipe presentation system which presents an integrated recipe for a plurality of dishes, and the recipe presentation method according to the present invention is advantageously used as a recipe presentation method of presenting an integrated recipe for a plurality of dishes.

REFERENCE SIGNS LIST

100 Recipe presentation system
101 Recipe selection unit
102 Recipe storage unit
103 Overlapping preparation element identification unit
104 Recipe integration unit
105 Recipe output unit

The invention claimed is:

1. A recipe presentation system which presents an integrated recipe for a plurality of dishes, the recipe presentation system comprising:
a user interface configured to input information and instructions for recipes of the plurality of dishes into the recipe presentation system;
a controller including a non-transitory memory storing a program, and a hardware processor that executes the program and causes the recipe presentation system to:
store, in a recipe storage of the recipe presentation system, the recipes for the plurality of dishes including preparation elements arranged in a hierarchy according to closeness to completion of preparation of the respective dishes, the preparation elements indicating an ingredient and a process for completing preparation of each of the dishes;
select a first recipe and a second recipe distinct from the first recipe from among the recipes stored in the recipe storage;
identify common preparation elements between the first recipe and the second recipe as overlapping preparation elements; and
generate the integrated recipe by arranging, in order of preparation, the preparation elements included in the first recipe and a first preparation method of the first recipe, the preparation elements included in the second recipe and a second preparation method of the second recipe, and the overlapping preparation elements identified, the overlapping preparation elements included in the integrated recipe being arranged as a single preparation element and provided with a third preparation method, the first preparation method, the second preparation method and the third preparation method also being different from each other; and
a display configured to display the integrated recipe generated on a monitor of the display,
wherein the hardware processor executes the program to cause the recipe presentation system to display, as separate objects of the integrated recipe on the display, the preparation elements included in the first recipe and the first preparation method of the first recipe, the preparation elements included in the second recipe and the second preparation method of the second recipe, and, as a single display object, the overlapping preparation elements and the third preparation method of the overlapping elements,
the hardware processor executes the program to cause the recipe presentation system to calculate and then to display a total quantity of the foodstuffs for preparation of the overlapping preparation elements using the third preparation method, the total quantity of the foodstuffs being equal to an allotment of the foodstuff in the overlapping preparation elements needed in the first recipe and an allotment of the foodstuff in the overlapping preparation elements needed in the second recipe, and
the hardware processor executes the program to cause the recipe presentation system to display a message for dividing the total quantity of the foodstuffs of the overlapping preparation elements after completion of the third preparation method into the respective allotments needed in the first and second recipes, the message including the display of the respective allotments needed in the first and second recipes and branches from a last step of third preparation method to respective first steps of the first and second preparation methods.

2. The recipe presentation system according to claim 1, wherein the identifying of the overlapping preparation elements includes comparing the preparation elements included in the first recipe and the preparation elements included in the second recipe, in descending order of the closeness of the preparation elements to the completion of the preparation of the respective dishes.

3. The recipe presentation system according to claim 1, wherein the identifying of the overlapping preparation elements includes comparing the preparation elements included in the first recipe and the preparation elements included in the second recipe from preparation elements, in ascending order of the closeness of the preparation elements to the completion of the preparation of the respective dishes.

4. A recipe presentation method for causing a recipe presentation system to present an integrated recipe for a plurality of dishes, the recipe presentation system including a user interface for inputting information and instructions, a recipe storage, a controller having a non-transitory memory storing a program and a hardware processor that executes the program so as to perform steps of the recipe presentation method, and a display for displaying the integrated recipe, the recipe presentation method comprising:

entering, using the user interface, input information and instructions for recipes of the plurality of dishes so as to be stored into the recipe storage of the recipe presentation system;

allowing a user to select, using the user interface, a first recipe and a second recipe which is distinct from the first recipe from among recipes for the plurality of dishes stored in a recipe storage, the recipes including preparation elements arranged in a hierarchy according to closeness to completion of preparation of the respective recipes, the preparation elements indicating an ingredient and a process for completing preparation of each of the dishes;

identifying, using controller, common preparation elements between the first recipe and the second recipe as overlapping preparation elements;

generating, using the controller, the integrated recipe by arranging, in order of preparation, the preparation elements included in the first recipe and a first preparation method of the first recipe, the preparation elements included in the second recipe and a second preparation method of the second recipe, and the overlapping preparation elements identified and a third preparation method of the overlapping elements, the integrated recipe being arranged such that the user recognizes, as a single preparation element, the identified overlapping preparation elements included in the integrated recipe and that the first preparation method, the second preparation method and the third preparation method are different from each other; and displaying, using a monitor of the display and as separate objects of the integrated recipe, the preparation elements included in the first recipe and the first preparation method of the first recipe, the preparation elements included in the second recipe and the second preparation method of the second recipe, and, as a single display object, the overlapping preparation elements and the third preparation method of the overlapping elements, the controller causes the recipe presentation system to calculate and then to display a total quantity of the foodstuffs for preparation of the overlapping preparation elements using the third preparation method, the total quantity of the foodstuffs being equal to an allotment of the foodstuff in the overlapping preparation elements needed in the first recipe and an allotment of the foodstuff in the overlapping preparation elements needed in the second recipe, and the controller causes the recipe presentation system to display a message for dividing the total quantity of the foodstuffs of the overlapping preparation elements after completion of the third preparation method into the respective allotments needed in the first and second recipes, the message including the display of the respective allotments needed in the first and second recipes and branches from a last step of third preparation method to respective first steps of the first and second preparation methods.

5. An integrated circuit for a recipe presentation system which presents an integrated recipe for a plurality of dishes, the recipe presentation system also including a user interface for inputting information and instructions, a recipe storage, a controller including the integrated circuit, and a display for displaying the integrated recipe, the integrated circuit comprising:

a recipe storage circuit configured to receive, via the user interface, input information and instructions for recipes of the plurality of dishes, and store the input information and instructions for recipes of the plurality of dishes into the recipe storage of the recipe presentation system;

a recipe selection circuit configured to allow a user to select via the user interface a first recipe and a second recipe which is distinct from the first recipe from among recipes for the plurality of dishes stored in a recipe storage, the recipes including preparation elements arranged in a hierarchy according to closeness to completion of preparation of the respective dishes, the preparation elements indicating an ingredient and a process for completing preparation of each of the dishes;

an overlapping preparation element identification circuit configured to identify common preparation elements between the first recipe and the second recipe as overlapping preparation elements;

a recipe integration circuit configured to generate the integrated recipe by arranging, in order of preparation, the preparation elements included in the first recipe and a first preparation method of the first recipe, the preparation elements included in the second recipe and a second preparation method of the second recipe, and the overlapping preparation elements identified by the overlapping preparation element identification circuit, the overlapping preparation elements included in the integrated recipe being arranged as a single preparation element and being provided with a third preparation method, the first preparation method, the second preparation method and the third preparation method also being different from each other; and a recipe display circuit configured to display the integrated recipe generated by the recipe integration circuit on a monitor of the display, wherein the recipe display circuit is configured to display, as separate objects of the integrated recipe, the preparation elements included in the first recipe and the first preparation method of the first recipe, the preparation elements included in the second recipe and the second preparation method of the second recipe, and, as a single display object, the overlapping preparation elements and the third preparation method of the overlapping elements, included in the integrated recipe, the recipe integration circuit calculates and then the recipe display circuit displays a total quantity of the foodstuffs for preparation of the overlapping preparation elements using the third preparation method, the total quantity of the foodstuffs being equal to an allotment of the foodstuff in the overlapping preparation elements needed in the first recipe and an allotment of the foodstuff in the overlapping preparation elements needed in the second recipe, and the recipe display circuit displays a message for dividing the total quantity of the foodstuffs of the overlapping preparation elements after completion of the third preparation method into the respective allotments needed in the first and second recipes, the message including the display of the respective allotments needed in the first and second recipes and branches from a last step of third preparation method to respective first steps of the first and second preparation methods.

* * * * *